June 26, 1945.  C. C. FARMER  2,379,289
CONTROL DEVICE
Filed Sept. 29, 1942  3 Sheets-Sheet 1

INVENTOR
Clyde C. Farmer
BY
A. M. Higgins
ATTORNEY

June 26, 1945.  C. C. FARMER  2,379,289
CONTROL DEVICE
Filed Sept. 29, 1942  3 Sheets-Sheet 2

INVENTOR
Clyde C. Farmer
BY
ATTORNEY

June 26, 1945. C. C. FARMER 2,379,289
CONTROL DEVICE
Filed Sept. 29, 1942 3 Sheets-Sheet 3

INVENTOR
Clyde C. Farmer
BY
*A. M. Higgins*
ATTORNEY

Patented June 26, 1945

2,379,289

UNITED STATES PATENT OFFICE 2,379,289

CONTROL DEVICE

Clyde C. Farmer, Pittsburgh, Pa., assignor to The Westinghouse Air Brake Company, Wilmerding, Pa., a corporation of Pennsylvania Application September 29, 1942, Serial No. 460,068

23 Claims. (Cl. 303—21)

This invention relates to control devices operatively responsive to the rate of acceleration or deceleration of a rotary element, such as a vehicle wheel, and suited for any desired indicating or control purpose.

The control device comprising my present invention is of the so-called rotary inertia type having a fly-wheel rotatively driven according to the speed of rotation of a rotary shaft and coupled to the shaft in a manner to permit the fly-wheel to over-run or under-run the shaft in response to deceleration or acceleration, respectively, of the shaft. Devices of this character are well-known and have been employed for various indicating or control purposes, such as the detection of the slipping condition of a vehicle wheel and the control of the brakes associated with the vehicle wheel in a manner to prevent the sliding of the vehicle wheel.

It is a well known fact that a slipping vehicle wheel, such as a railway car wheel, rotatively decelerates or accelerates at an abnormally rapid rate in response to a brake application or a propulsion torque respectively, applied thereto and sufficient to exceed the adhesion between the wheel and rail or road surface. The rotative deceleration or acceleration of the vehicle wheel at the rate exceeding a certain rate, such as ten miles per hour per second, is thus positive indication of the slipping condition of the wheel.

The terms "sliding condition" and "slipping condition" as employed herein are not synonymous. The term "sliding condition" refers only to the locked or non-rotative condition of the vehicle wheel whereas the term "slipping condition" refers to the rotation of the vehicle wheel at a speed different from that corresponding to vehicle speed at a given instant.

In my prior Patent 2,184,550 there is disclosed a rotary inertia device in which the fly-wheel is connected to the driving shaft through a clutch device of the friction type, the clutch device being such as to permit the fly-wheel to over-run the driving shaft when the rotative deceleration of the driving shaft exceeds a certain rate. The device in this patent, moreover, comprises an arrangement effective in response to the relative rotative movement of the fly-wheel and the driving shaft for partially releasing the effective coupling force of the clutch whereby a braking effect is exerted on the fly-wheel so that it rotatively decelerates at a rate not exceeding the rate of retardation of the vehicle. In such case, therefore, the rotation of the fly-wheel relative to the shaft continues until such time as the shaft is restored substantially to the rotational speed of the fly-wheel.

The device functions in a fluid pressure brake control system to initiate a reduction in the degree of application of the brakes associated with a slipping wheel when the slipping begins and continues such reduction until such time that the slipping wheel is restored substantially to vehicle speed.

It is an object of my present invention to provide a control device of the rotary inertia type having a clutch for establishing a driving connection between the fly-wheel and a driving shaft and characterized by a novel arrangement for controlling the clutch means whenever the driving shaft changes its rotational speed at a rate exceeding a certain rate for maintaining a continued operative response of the device as long as the driving shaft rotates at a speed substantially different from that of the fly-wheel.

More specifically, it is the object of my invention to provide a control device of the type indicated in the foregoing object and characterized by an arrangement including opposing centrifuges carried by the fly-wheel and the driving shaft respectively, whereby to control the clutch means between the fly-wheel and the driving shaft and thus the operative response of the device.

It is another object of my invention to provide a vehicle brake control system employing the novel type of control device mentioned in the foregoing objects for the purpose of initiating a reduction in the degree of application of the brakes associated with a wheel that starts to slip and continuing such reduction automatically throughout the slipping interval.

The above objects, and other objects of my invention which will be made apparent hereinafter, are attained in apparatus subsequently to be described and shown in the accompanying drawings wherein.

Description of first embodiment

Figure 1:
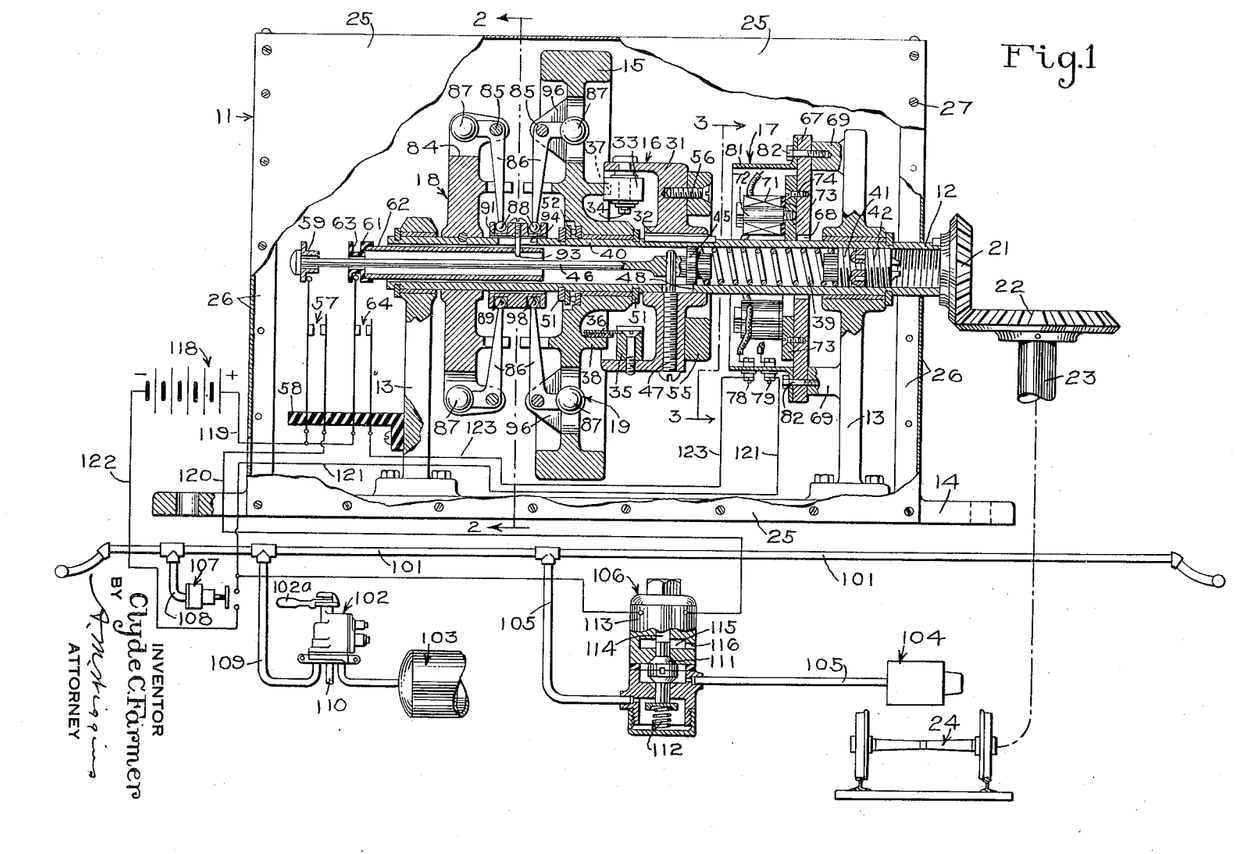
Figure 1 is a diagrammatic view, showing one embodiment of my invention employed in connection with the wheels of a railway vehicle or car for the purpose of controlling the brakes associated with the wheels.
Figure 2:
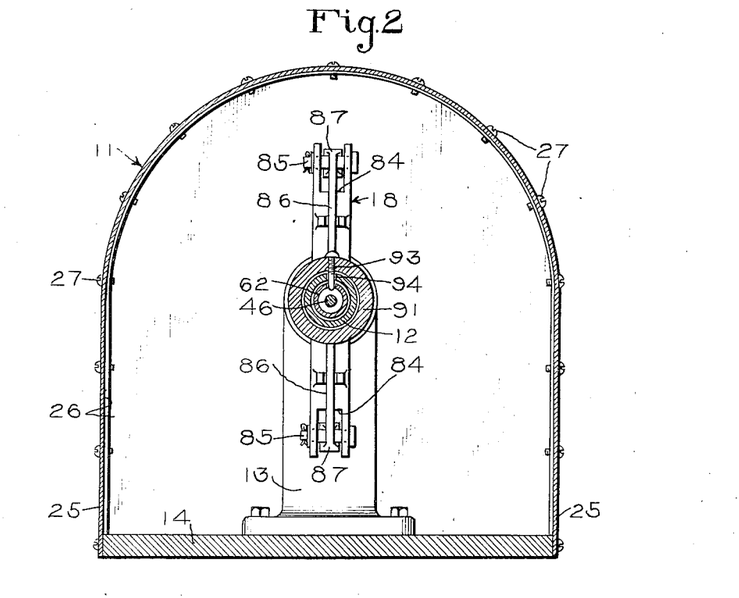
Figures 2 and 3 are sectional views, taken on the lines 2—2 and 3—3 respectively of Figure 1, showing further details of construction of the control device.
Figure 3:
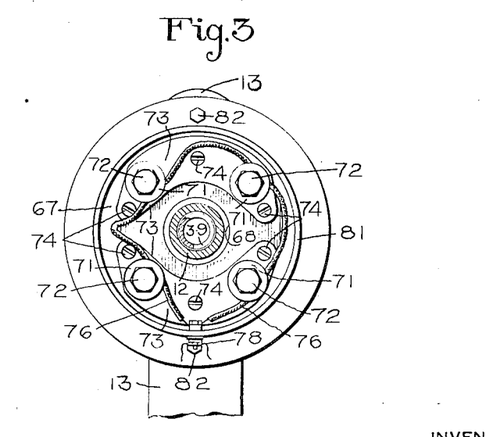

Referring to Figures 1, 2, and 3, showing the first embodiment of my invention, the control device 11 shown therein comprises essentially a tubular drive shaft 12 journaled in longitudinally spaced bearing pedestals 13 that are attached to a base 14; a fly-wheel 15 rotatively mounted on the shaft 12 between the pedestals 13; a clutch device 16 for coupling the fly-wheel to the drive shaft 12; a clutch release magnet device 17 carried by one of the pedestals 13; a centrifuge device 18 carried by the shaft 12 and rotatable at all times according to the speed of the shaft; and a centrifuge device 19 carried by the fly-wheel 15 and rotatable at all times in accordance with the rotational speed of the fly-wheel.

Shaft 12 may be driven through any suitable connection by rotation of a rotary member, the rate of change of speed of which is to be registered or detected. As shown, the shaft 12 has a bevel-pinion 21 fixed thereon that meshes with a corresponding bevel-gear 22 fixed on a shaft 23. The shaft 23 may be coupled directly to the axle of a wheel and axle unit 24 of a railway car and is preferably flexible in character to permit mounting of the control device 11 on the body of the car.

The control device 11 may be provided, as shown, with a suitable housing comprising two sheet metal end members 26 and a U-shaped casing 25 of sheet metal, the casing being secured as by screws 27 to the end members and to the base 14.

Considering the parts of the control device 11 in further detail, the clutch device 16 comprises a cup-shaped spider member 31 of non-magnetic material, such as brass or aluminum, having a central hub 32 which is slidably keyed or splined to the drive shaft 12 so as to permit the axial movement of the spider member 31 with respect to the shaft 12.

A roller 33 is carried on a pin 34 that is fixed radially to the cylindrical wall of spider member 31. The roller 33 engages in a shallow V-shaped notch 37 formed in an annular cam 38 at one side of the web of fly-wheel 15. The roller 33 is yieldingly held in the notch 37 by a coil spring 39, contained within the tubular bore 40 of the drive shaft 12, which is effective to urge the spider member 31 in the left-hand direction. A suitable stop-nut 41 and lock-nut 42 are screwed into the open end of the shaft 12 to form a support for one end of the spring, the other end of the spring acting on a piston 45 slidably in the bore 40 of the shaft 12. The piston 45 has a stem 46 that extends longitudinally through the bore 40 and projects out of the left-hand end of the bore 40 for a purpose presently to be described. The spider member 31 is connected to the stem 46 adjacent piston 45 by a screw 47 that projects through a longitudinal slot 48 in the wall of the shaft 12 and into a suitable hole in the stem 46.

Secured to the cylindrical wall of spider member 31 at a point diametrically opposite to the roller 33 is a counter-weight 35 that provides dynamic balance for the spider member 31. A brake shoe 36, in the form of a flat, steel spring having a friction element thereon, is secured to the spider member 31 as by the same screw that attaches the counter-weight 35, so as to engage the inner surface of the annular cam 38 to exert a braking effect on the fly-wheel 15, for a purpose hereinafter explained, when the fly-wheel rotates relative to the shaft 12.

The hub of the fly-wheel 15 is fixed for rotation on the shaft 12 in a certain axial position, as by snap rings 51 at opposite ends of the hub. A thrust bearing 52 is preferably provided between one of the snap rings and the hub of the fly-wheel to prevent undue friction between the hub of the fly-wheel and the snap ring which might otherwise be produced by the biasing force of spring 39 acting through the clutch spider member 31 and roller 33 on the fly-wheel 15.

A ring 55 of magnetic material is suitably secured to the spider member 31, as by one or more screws 56, in concentric relation to the shaft 12 and functions in cooperation with the clutch release magnet device 17 in the manner presently to be described.

The spring 39 is so designed in relation to the dimensions and weight of the fly-wheel 15 as to maintain the fly-wheel in coupled relation to the shaft 12 as long as the rate of rotative deceleration or acceleration of the shaft 12 does not exceed a certain rate. Thus when the shaft 12 is driven according to the speed of the wheel unit 24, the fly-wheel is maintained in coupled relation to the shaft 12 as long as the wheels do not rotatively decelerate or accelerate at a rate exceeding ten miles per hour per second.

When the shaft 12 rotatively accelerates or decelerates at a rate exceeding the predetermined rate, the inertia of the fly-wheel 15 is effective to overcome the force of the spring 39 and thus to cause the roller 33 to ride out of the notch 37 to the outer surface of annular cam 38, thereby causing the spider member 31 to be shifted axially in the right-hand direction in opposition to the force of the spring 39.

The piston 45 and its stem 46 is thus correspondingly shifted axially in the right-hand direction to effect closing of a switch device 57. The switch device 57 is of the telephone type and may comprise two flexible contact fingers having cooperating contacts and carried in a suitable insulating member 58 attached to the adjacent pedestal 13. One of the contact fingers of the switch device 57 is longer than the other and extends upwardly toward the stem 46 so as to be engaged by a collar 59 carried on the stem 46. The contact fingers of the switch 57 are normally separated and are engaged only in response to the bending of the long contact finger in the right-hand direction in response to the shifting of the stem 46 of the piston 45.

The outer end of the stem 46 is supported in a suitable guide bushing 61 attached to the outer end of a sleeve 62 that is axially slidable in the bore 40 of the shaft 12. The guide bushing 61 has an annular groove 63 therein, in which is received the end of a contact finger of a switch device 64, the two contact fingers of which are supported by the insulating base 58. The contact fingers of switch 64 are normally separated and are operated into contact with each other only in response to the movement of the sleeve 62 in the right-hand direction under the control of the two centrifuge devices 18 and 19 in the manner hereinafter to be described.

The clutch release magnet device 17 comprises an annular base 67, of non-magnetic material such as brass, aluminum, or molded material, having a central opening 68 through which the shaft 12 extends, the member being secured to two or more bosses 69 projecting laterally from the right-hand bearing pedestal 13.

As shown in Figure 3, the clutch release magnet device 17 further comprises a plurality of electro-magnet windings 71, illustrated as four in number, each winding surrounding a magnetic core element in the form of a securing bolt 72 screwed into one of two arcuate members 73 of magnetic material that are, in turn, attached by screws 74 to the non-magnetic base 67.

As will be seen in Figure 3, two of the electro-magnet windings 71 are attached by bolts 72 in spaced relation to one of the arcuate magnetic members 73 and the other two windings 71 are similarly attached to the other arcuate magnet member 73.

The windings 71 are connected in series relation by a wire 76 in such a manner as to cause the heads of the bolts 72 to act as pole-pieces of opposite polarity, alternately. Thus, two U-shaped electro-magnets are provided in the magnet device 17.

The opposite ends of the wire 76 are connected to suitable stud bolts or terminal posts 78 and 79 respectively, that are secured in spaced relation in an insulating cover 81. The insulating cover 81 is in the form of a hollow cylinder disposed in concentric relation to the shaft 12 and having at one end a radial flange secured along with base 67, by screws 82, to the bosses 69 on pedestal 13.

The magnetic attraction exerted by the pole-pieces or bolt heads of the bolts 72 of the magnet device 17 for the magnetic ring 55 on the clutch spider member 31 is ineffective to move the spider member 31 against the opposition of the spring 39 as long as the roller 33 engages in the notch 37 on the fly-wheel 15. When the spider member 31 is shifted axially in the right-hand direction with respect to the shaft 12 due to the fly-wheel 15 over-running or under-running shaft 12, the ring 55 is brought into close proximity to the heads of the bolts 72 so as to render the magnetic attraction of the magnet device 17 sufficient to maintain spider member 31 in displaced axial position with the roller 33 out of contact with the outer surface of the cam 38 on the fly-wheel 15. It will be understood that the ring 55 does not engage the heads of the bolts 72 but remains out of engagement therewith, thereby avoiding any frictional contact between the ring and the stationary bolt heads.

The manner in which the windings 71 of magnet device 17 are energized so as to be effective to maintain the clutch spider member 31 in disengaging position with respect to the fly-wheel 15 will be explained presently.

The centrifuge device 18 comprises a supporting member having a hub portion and two diametrically opposite radially extending arms provided with yokes 84 at the outer ends thereof. Pivotally carried on a suitable pin 85 in each of the yokes 84 is a bell-crank lever 86, one arm of which is short and the other of which is long. Fixed on the outer end of the short arm of each bell-crank lever 86 is a weight in the form of a solid cylinder 87. The outer end of the long arm of each of the bell-crank levers 86 is formed in the shape of a ball 88, the balls on the two levers 86 engaging in an annular groove 89 formed in a collar 91 slidably mounted on the shaft 12.

The sliding collar 91 is connected by a screw or pin 93 to the sliding sleeve 62, the pin 93 extending through an axially extending slot 94 in the wall of the shaft 12 which permits axial movement of the collar and sleeve.

Centrifuge 19, carried by the fly-wheel 15 is similar to centrifuge 18 and comprises a plurality of bell-crank levers 86 each pivoted on a pin 85 supported between suitable bracket 96 attached to the web of the fly-wheel 15. A cylindrical weight 87 is fixed on the outer end of the short arm of each of the above levers 86 and the outer end of the long arm of these levers is formed as a ball 88. The balls 88 of the bell-crank levers 86 of the centrifuge 19 engage in an annular groove 98 in sliding collar 91 located in axially spaced relation to the groove 89.

The pins 85 on which the bell crank levers of the two centrifuges 18 and 19 are supported are at exactly the same radial distance from the axis of the rotation of the shaft 12 and the weight of the cylindrical weights 87 of the two centrifuges are identical. It will thus be seen that as long as the fly-wheel 15 and the shaft 12 rotate at the same speed, the centrifugal forces of the weights 87 of the two centrifuges are exerted of the sliding collar 91 in opposite directions and, being of equal intensity, the sliding collar 91 remains unmoved. Whenever the fly-wheel rotates at a different speed than the shaft 12, for example at a faster speed than the shaft 12, the forces exerted on the sliding collar 91 are unbalanced and the collar 91 is accordingly shifted in an axial direction corresponding to the predominating centrifugal force of one or the other of the centrifuges.

When the sliding collar 91 is shifted in a right-hand direction in response to the predominating centrifugal force exerted by the centrifuge 19, the sleeve 62 is correspondingly shifted to effect closing of the switch 64.

The switch 64 controls the circuit of the magnet windings 71 of the magnet device 17. This circuit will be traced in detail hereinafter in connection with an assumed operation, but it may be here briefly stated that the differential in the rotational speeds of the fly-wheel 15 and the shaft 12 produced when the clutch device 16 is operated to disengage the fly-wheel 15 from the shaft is such as to cause substantially instantaneous closure of the switch 64 and consequent energization of the magnet windings of the magnet device 17, thus rendering the magnet device 17 effective to maintain the spider member 31 of the clutch device 16 in its disconnecting position.

While my control device 11 is suited for various applications, wherein it is desired to register a predetermined rate of rotative acceleration or deceleration of a rotary element, I have for purpose of illustration shown it in connection with a fluid pressure brake control equipment associated with the wheels of a railway car. For purposes of the present application, I have illustrated a simple straight-air type of fluid pressure brake equipment comprising a train pipe 101, hereinafter designated the straight-air pipe; a brake valve 102 of the self-lapping type for controlling the pressure in the straight-air pipe 101; a source of fluid under pressure such as a reservoir 103 that is normally charged with fluid under pressure as by a fluid compressor not shown; a brake cylinder 104 to which fluid under pressure is supplied from the straight-air pipe 102 through a branch pipe 105 in which is interposed a magnet valve device 106; and fluid pressure operated switch 107 connected to the straight-air pipe 101 through a branch pipe 108.

The brake valve 102 may be of any well-known self-lapping type, such as that disclosed and claimed in Patent No. 2,042,112 to Ewing K. Lynn and Rankin J. Bush. Briefly, the brake valve 102 may comprise an operating handle 102a fixed on the end of a rotary operating shaft, the rotation of which causes operation of suitable supply and release valves of the self-lapping type. With the brake valve handle 102a in its normal or brake release position, the valve mechanism of the brake valve is conditioned to cause fluid under pressure to be exhausted to atmosphere from the straight-air pipe 101 through a branch pipe 109 and an exhaust port and pipe 110. When the brake valve handle 102a is displaced in a horizontal plane out of its normal position into its so-called application zone, the valve mechanism of the brake valve operates to cause fluid under pressure to be supplied from the reservoir 103 to the straight-air pipe 101. The nature of the valve mechanism of the brake valve is such as to cause a lapping or cutting-off of the supply of fluid under pressure to the straight-air pipe 101 as the pressure established in the straight-air pipe increases above a certain value corresponding to the degree of displacement of the brake valve handle 102a out of its normal position. The pressure established in the straight-air pipe 101 is, therefore, substantially proportional to the degree of displacement of the brake valve handle 102a out of its normal or brake release position.

If the pressure in the straight-air pipe 101 reduces for any reason, such as leakage, the valve mechanism of the brake valve 102 operates automatically to continue the supply of fluid under pressure to the straight-air pipe 101 to maintain a pressure therein corresponding to the position of the brake valve handle 102a. This pressure-maintaining feature of the brake valve will be referred to hereinafter in connection with an assumed operation.

The magnet valve device 106 is of standard type, and comprises a double-beat valve 111 urged to an upper seated position by a coil spring 112 and actuated in opposition to the spring 112 to a lower seated position in response to energization of a magnet winding or solenoid 113 acting through the medium of a plunger 114.

In its upper seated position, in which it is shown, the double-beat valve 111 establishes communication through the branch pipe 105 from the straight-air pipe 101 to the brake cylinder 104, thus permitting fluid under pressure to be supplied to the brake cylinder and released therefrom under the control of the brake valve 102.

In the lower seated position of valve 111, communication through the branch pipe 105 is closed and a connection established between the brake cylinder 104 and a chamber 115 which is constantly connected to atmosphere through a port 116, thereby causing fluid under pressure to be rapidly released from the brake cylinder 104 independently of the fluid pressure in the straight-air pipe 101.

It will be understood that the brake cylinder 104 is of the type that is effective to cause application of the brakes in response to the supply of fluid under pressure thereto and release of the brakes in response to the venting of fluid under pressure therefrom. It will thus be seen that energization of the magnet winding 113 of the magnet valve device 106 will cause a release of the brakes associated with the car wheels independently of the brakes associated with other car wheels, not shown, but similarly controlled according to the fluid pressure in the straight-air pipe 101.

The pressure-operated switch 107 may be of any suitable type responsive to variations of pressure in the straight-air pipe 101 to opposite sides of a certain critical pressure. Thus, for purposes of the present invention, it will be assumed that the pressure switch 107 is actuated to its closed position and maintained therein only so long as the pressure in the straight-air pipe 101 exceeds a certain low pressure such as five pounds per square inch and is restored to its open position in response to the reduction of pressure in the straight-air pipe 101 below five pounds per square inch.

*Operation of first embodiment*

Let it be assumed that a railway car, equipped as shown in Figure 1, is traveling under power and that the operator desires to effect an application of the brakes to bring the car to a stop. To do so the operator first cuts-off the propulsion power and then shifts the brake valve handle 102a from its brake release position into its application zone an amount determined according to the desired degree of brake application. Fluid under pressure is accordingly supplied to charge the straight-air pipe 101 to a corresponding pressure, such as fifty pounds per square inch, fluid at the pressure in the straight-air pipe being supplied through branch pipe 105 to brake cylinder 104 to cause application of the brakes associated with the car wheels to a corresponding degree.

As long as the car wheels do not slip, no variation in the degree of application of the brakes occurs, aside from variations caused by variations in the coefficient of friction between the brake shoes and the wheels, except in accordance with the operation of the brake valve 102 to vary the pressure in the straight-air pipe 101.

Let it be assumed, however, that when the brakes are applied, the car wheels shown in the drawings begin to slip. As previously stated, the car wheels rotatively decelerate at an abnormally rapid rate during a slipping condition. In such case, therefore, the inertia of the fly-wheel 15 of the control device 11 overcomes the force of the spring 39 and causes the axial shifting of the spider member 31 of the clutch device 16 so as to close the switch 57.

Switch 57 is effective, when closed, to establish a circuit for energizing the magnet winding 113 of the magnet valve device 106. The circuit extends from the positive terminal of a storage battery 118, by way of a wire 119, switch 57, a wire 120 including the magnet winding 113 of the magnet valve device 106, a wire 121, pressure switch 107 now in closed position due to the pressure in the straight-air pipe 101 having exceeded five pounds per square inch, and a wire 122 to the negative terminal of the battery 118.

The magnet valve device 106 is accordingly operated to rapidly vent fluid under pressure from the brake cylinder 104, thereby causing a rapid reduction in the degree of application of the brakes associated with the slipping car wheels.

Due to the rapid reduction in the degree of application of the brakes associated with the slipping wheels, the wheels promptly cease to decelerate and begin to accelerate back toward a speed corresponding to car speed without actually reducing to a locked or sliding condition.

When the fly-wheel 15 rotatively over-runs the shaft 12, the instantaneous differential in the rotational speeds of the two centrifuges 18 and 19 is immediately effective to shift the collar 91 so as to cause closure of the switch 64. Switch 64 is effective, when closed, to establish a circuit for energizing the magnet windings 71 of the clutch release magnet device 17. This circuit extends from positive terminal of the battery 118, by way of the wire 119, switch 64 and a wire 123 to the terminal post 78, thence by way of the wire 76 including the serially-connected magnet windings 71 to the terminal post 79, thence by way of wire 121 which is connected to the terminal post 79, the pressure switch 107 and wire 122 to the negative terminal of the battery 118.

The magnet windings 71 of the magnet device 17 are thus energized substantially at the time that the spider member 31 of the clutch device 16 is shifted axially in the righthand direction due to the fly-wheel 15 over-running the shaft 12. Consequently, the magnet device 17 is effective to maintain the spider member 31 displaced in its right-hand position to prevent the return of roller 33 into engagement with the notch 37 in annular cam 38 on the fly-wheel 15.

The fly-wheel 15 is thus free to rotatively decelerate at a rate different from the rate of rotative deceleration of the shaft 12. The rate at which fly-wheel 15 decelerates is determined partly by the braking effect exerted by brake shoe 36 and partly by the friction between the balls 88 on the ends of the bell crank levers 86 of the centrifuge 19 with the sliding collar 91. The rate of deceleration of fly-wheel 15 is designed to correspond substantially to the normal rate of retardation of the car. Thus, the fly-wheel 15 continues to rotate at a speed corresponding to the speed of the car, whereas the shaft 12 rotates at a speed corresponding to the rotational speed of the individual wheel and axle unit 24.

As long as the wheel and axle unit 24 rotates at a speed substantially less than that of the fly-wheel 15, the differential force exerted by the two centrifuges 18 and 19 on the sliding collar 91 is sufficient to maintain the switch 64 in closed position, thereby maintaining the magnet winding 71 of the magnet device 17 energized and the spider member 31 of the switch device 16 in its right-hand or disconnecting position. In its disconnecting position the clutch spider member 31 maintains switch 57 in its closed position, thereby maintaining the magnet winding 113 of the magnet valve device 106 continuously energized so as to cause the venting of fluid under pressure from the brake cylinder 104 to continue during such interval of time.

When the slipping wheels have accelerated substantially back to a speed corresponding to car speed and, thus to the rotational speed of the fly-wheel 15, the forces exerted on collar 91 by centrifuges 18 and 19 are again balanced. In such case the resiliency of the contact fingers of switch 64 causes the sleeve 62 to be shifted in the left-hand direction sufficiently to effect disengagement of the contact fingers of the switch 64. The switch 64 is thus opened and interrupts the circuit for energizing the magnet windings 71 of the magnet device 17. The magnetic contraction of the magnet device 17 for the clutch spider member 31 is thus removed and the biasing spring 39 accordingly restores the clutch spider member 31 into engagement with the cam 38 on the fly-wheel 15. The roller 33 may not immediately reengage in the notch 37 of the cam 38 but it will do so when it again becomes aligned with the notch as a result of the continuing slight relative rotative movement of the fly-wheel 15 with respect to the shaft 12. At such time, therefore, the fly-wheel 15 again becomes positively locked to the shaft 12 and accordingly rotates therewith.

When the clutch spider member 31 is restored to its locking position with respect to the fly-wheel 15, the stem 46 is restored in the left-hand direction sufficiently to effect separation of the contact fingers of the switch 57. Opening of the switch 57 effects interruption of the circuit energizing the magnet winding 113 of the magnet valve device 106.

Magnet valve device 106 is accordingly restored to its normal position, in which it is shown, thereby re-establishing communication through the branch pipe 105 from straight-air pipe 101 to the brake cylinder 104. Fluid under pressure is thus resupplied from the straight-air pipe 101 to the brake cylinder 104 to effect a reapplication of the brakes on the corresponding wheels.

The supply of fluid under pressure from straight air pipe 101 to the brake cylinder 104 tends to reduce the fluid pressure in straight-air pipe 101, but as previously mentioned, the pressure-maintaining feature of the brake valve 102 is effective to cause fluid under pressure to be supplied to the straight-air pipe 101 to maintain a pressure therein corresponding to the position of the brake valve handle. Accordingly, the brakes are reapplied by brake cylinder 104 to a degree corresponding to the position of the brake valve handle 102a.

In the event that the wheels again begin to slip upon reapplication of the brakes, the control device 11 again operates in response to the slipping of the wheels and the above operation is again repeated so that at no time are the wheels permitted to decelerate to a locked or sliding condition.

Various expedients have been resorted to for the purpose of controlling the rate at which fluid under pressure is resupplied to the brake cylinder 104, following slipping of the wheels, in order to minimize the possibility of repeated wheel slip cycles. It will be understood that I contemplate the application of my control device 11 in a fluid pressure brake equipment of such type. I have therefore omitted details of such features.

When the car comes to a complete stop, the switch 64 is always restored to its open position because the balancing of the forces on sliding collar 91 as a result of the non-rotation of the centrifuges 18 and 19 renders the bias on one of the contact fingers of the switch free to separate the contact fingers of the switch. The magnet winding of the magnet device 17 thus always deenergized in response to stopping of the car so as to permit restoration of the clutch spider member 31 into locking engagement with the fly-wheel 15. The switch 57 is thus correspondingly always restored to its open position to effect deenergization of the magnet winding 113 of the magnet valve device 106. In any event, fluid under pressure is always resupplied to the brake cylinder 104 when the car comes to a complete stop so as to maintain the brakes applied.

When the operator desires to again proceed under power, he first releases the brakes merely by restoring the brake valve handle 102a to its brake release position. Fluid under perssure in the straight-air pipe 101 and in the brake cylinder 104 is thus vented to atmosphere through the port and pipe 110 at the brake valve 102 and the brakes are accordingly completely released.

When the pressure in the straight-air pipe 101 reduces below five pounds per square inch, the pressure switch 107 is restored to its open position, thereby interrupting the circuit of the magnet windings 71 of the magnet device 17 and that of magnet winding 113 of the magnet valve device 106. Possible energization thereof in response to an abnormal rate of acceleration of the car wheels, such as might occur if the car wheels are driving wheels, is thus prevented.

It will be understood that the control device 11 is responsive to an abnormal rate of acceleration of the car wheels as well as an abnormal rate of deceleration of the car wheels. I have not illustrated the manner in which the control device 11 may be utilized to indicate an abnormal rate of acceleration but it will be apparent from the fact that the movement of the sleeve 62 effected in response to acceleration will be opposite to that occurring during deceleration that the only change required is to reverse the position of the switch 64 so that it is closed in response to movement of the sleeve 62 in the left-hand direction instead of the right-hand direction.

*Description of second embodiment*

Figure 4:
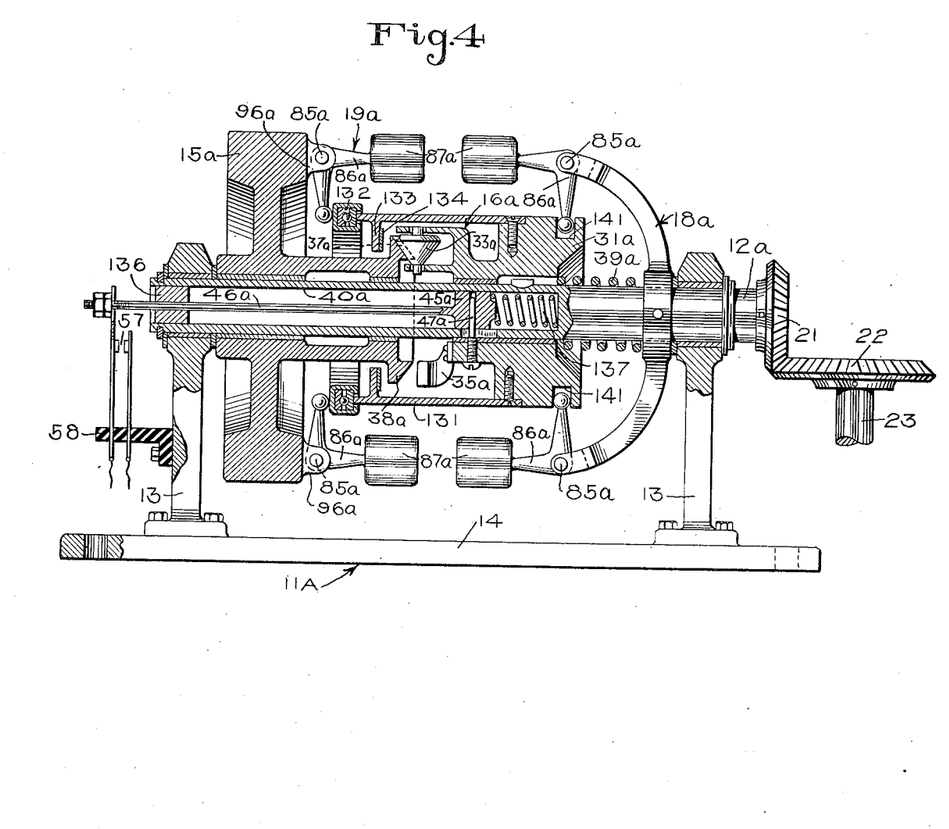
Figure 4 is a fragmental view, showing a second embodiment of my invention.

The second embodiment of my invention, shown in Figure 4, typifies a simplified form of the control device 11 in which the operation of the clutch device coupling the flywheel to the drive shaft is controlled directly in response to the opposing forces of two centrifuges carried respectively by the fly-wheel and shaft, thereby dispensing with the clutch release magnet device 17 employed in the first embodiment.

The control device shown in Figure 4, hereinafter designated control device 11a, comprises a base 14 and pedestals 13 for supporting a drive shaft 12a driven through bevel gears 21 and 22 in the same manner as in the first embodiment. A fly-wheel 15a having a relatively long hub is rotatively mounted on the shaft 12a and carries a centrifuge device 19a.

A centrifuge device 18a is carried by and fixed to the shaft 12a for rotation therewith.

A clutch device 16a is provided for coupling the flywheel 15a to the shaft 12a. The clutch device 16a comprises a spider member 31a splined or keyed to the shaft 12a in a manner permitting axial movement thereof on the shaft while fixed thereon for rotation with the shaft at all times. The spider member 31a carries a conical roller 33a that cooperates with a conical cam 38a, having a shallow V-shaped notch 37a therein, formed at the end of the hub of the flywheel 15a.

A counter-balancing weight 35a is secured to the spider member 31a in diametrically opposite relation to the roller 33a for dynamically balancing the spider member.

A coiled spring 39a, disposed in concentric surrounding relation to the shaft 12a, acts to urge the spider member 31a in the left-hand direction to cause the roller 33a to engage in notch 37a, thereby locking the fly-wheel 15a to the shaft 12a. The strength of spring 39a is such as to cause the fly-wheel 15a and shaft 12a to rotate together until such time as the shaft 12a changes its rotational speed, that is either accelerates or decelerates, at a rate exceeding a certain rate.

Secured to the spider member 31a is a cylindrical member 131 which surrounds the shaft 12a in concentric relation. The member 131 carries at the outer end thereof a thrust bearing 132.

Formed on or attached to the cylindrical member 131 adjacent the outer end thereof is an inwardly extending radial flange 133 having a friction member 134 secured to one face thereof and effective to engage the radial rear surface of the cam 38a on the hub of the fly-wheel 15a when the spider member 31a is shifted axially in the right-hand direction sufficiently to disengage the roller 33a from the cam. A braking action is accordingly produced on the fly-wheel 15a to cause it to rotatively decelerate at a rate corresponding substantially to the normal maximum rate of retardation of a car, such as four or five miles per hour per second.

In a manner similar to the clutch spider member of the first embodiment, the spider member 31a of the present embodiment is connected to a piston 45a operating in the bore 46a of the shaft 12a by a screw or pin 47a that extends through a suitable slot in the wall of the shaft 12a. The piston 45a has a stem 46a that extends through the bore and projects out of the left-hand open end thereof, a suitable guide bushing 136 removably fixed in the bore 46a serving to support the end of the stem 46a.

Interposed between the piston 45a and the end of the bore 46a in the shaft 12a is a coil spring 137 which assists spring 39a in restoring the piston 45a to its normal position and also prevents chattering of the piston on the pin 47a.

The stem 46a of the piston 45a is effective to operate a switch 57, corresponding to the switch 57 in the first embodiment, which functions in exactly the same manner.

The centrifuge device 18a comprises a hub portion having two oppositely extending curved arms terminating in yokes in which bell-crank levers 86a are pivotally mounted on pins 85a. A weight 87 is fixed on the outer end of one of the arms of each of the levers and the end of the other arm is of ball-shape and engages in an annular groove 141 provided at one end of the spider member 31a of the clutch 16a. It will thus be apparent that upon rotation of the shaft 12a, the centrifugal force on the weights 87 is effective to urge the spider member 31a in the left-hand direction to assist the spring 39a in maintaining the cooperative engagement of roller 33a with the notch 37a in the cam 38a on fly-wheel 15a.

The centrifuge device 19a carried by the flywheel 15a comprises a plurality of bell-crank levers 86a, each pivotally mounted on a pin 85 in the corresponding yoke brackets 96a formed on or attached to the rim of the fly-wheel 15a. A weight 87 is attached to the outer end of one arm of each of the bell-crank levers 86a and the outer end of the other arm of each lever is of ball-shape and engages the outer surface of the thrust bearing 132.

The centrifugal force on the weights 87 of centrifuge device 19a is accordingly effective to exert a force urging the spider member 31a of the clutch device 16a in the right-hand direction in opposition to the force exerted by the centrifuge device 18a. The nature of the thrust bearing 132 is such that friction between the bell-crank levers 86a and the cylindrical member 131 carried on the spider member 31a, which would otherwise result due to the relative rotation of the fly-wheel and the shaft 12a, is negligible.

*Operation of second embodiment*

When the shaft 12a rotates at a constant speed, the centrifugal forces exerted by the two centrifuges 18a and 19a on the spider member 31a are equal and opposite and spring 39a is effective to urge the spider member 31a in the left-hand direction so as to cause the roller 33a to engage in locking relation in the cam notch 37a on the hub of the fly-wheel 15a, thereby locking the fly-wheel to the shaft and causing it to rotate at the same speed as the shaft.

When the shaft 12a rotatively decelerates, the fly-wheel 15a tends to overrun the shaft 12a due to its inertia or momentum. The rate of rotative deceleration of shaft 12a at which the inertia force of momentum of the fly-wheel 15a is sufficient to cause axial movement of the spider 31a of the clutch device 16a in the right-hand direction will depend upon the speed of the shaft 12a. This is so because in order to shift the spider 31a in the right-hand direction it is necessary to move the weights 87 of the centrifuge device 18a radially inward. The centrifugal force acting to move the weights radially outward must, therefore, be overcome in order to move the weights radially inward. Due to the fact that the centrifugal force on the weights 87 will be proportional to the square of the rotational speed of the shaft 12a, the force which must be exerted to shift the weights 87 of the centrifuge device 18a radially inward will not vary in direct proportion to the speed.

The rate of rotative deceleration of the shaft 12a must therefore, be higher at the higher speeds in order to cause shifting of the clutch spider member 31a in the right-hand direction in response to the momentum of the fly-wheel 15a because the force of momentum of the fly-wheel is proportional to the rate of change of speed of the fly-wheel.

Assuming, however, that the shaft 12a does rotatively decelerate at a sufficient rate to cause shifting of the clutch spider member 31a in the right-hand direction in opposition to the spring 39a and the centrifugal force on the weights 87 of the centrifuge device 18a sufficiently to disengage the roller 33a from the notch 37a in the cam 38a on the hub of the fly-wheel 15a, it will be seen that instantaneously the rotational speed of the fly-wheel exceeds that of the shaft 12a because it is unlocked from the shaft. Moreover, since the radius of rotation of the weights 87 of the centrifuge 18a has been decreased while that of the weight 87 of the centrifuge device 19a has not been measurably decreased, it will be seen that once the fly-wheel 15a is unlocked from the shaft 12a, the differential between the centrifugal force on the weights 87 of the centrifuge 19a and the centrifugal force on the weights 87 of the centrifuge 18a becomes effective to hold the spider member 31a displaced in its right-hand position in opposition to the force of spring 39a. This differential increases as the disparity in the rotational speeds of the fly-wheel and the shaft increases, as it does during the decelerating portion of the slipping cycle of a vehicle wheel.

With the roller 33a of the clutch device 16a thus held out of engagement with the cam 38a on the hub of the fly-wheel, the fly-wheel has a braking effect exerted thereon by the engagement of the friction surface 134 on the flange 133 of the cylindrical member 131. This braking effect is such as to cause the fly-wheel 15a to be rotatively decelerated substantially in accordance with the rate of retardation of the car or vehicle so that the instantaneous speed of the fly-wheel corresponds substantially to the instantaneous speed of the car.

When the spider member 31a of the clutch device 16a is shifted in the right-hand direction, switch 57 is closed to effect energization of the magnet winding 113 of magnet valve 106 just as in the first embodiment. Thus, assuming that a brake application has been effected, the fluid under pressure is released from the brake cylinder 104 just as in the operation of the first embodiment.

Due to the rapid release of reduction in the degree of application of the brakes associated with the slipping wheels, shaft 12a promptly ceases to decelerate and begins to accelerate back toward a speed corresponding to car speed. As long as the shaft 12a rotates at a speed sufficiently less than the speed of rotation of the fly-wheel 15a, the differential of the centrifugal forces exerted by the two centrifuges is effective to maintain the roller 33a of the clutch device 16a displaced in its right-hand position, thereby causing the switch 57 to be maintained closed and the reduction in the degree of application of the brakes to be continued.

When the slipping vehicle wheels have been restored substantially to vehicle speed, however, the differential between the forces of the two centrifuges 18a and 19a is insufficient to overcome the springs 39a and 137 and the springs therefore shift the spider member 31a in the left-hand direction to effect reengagement of the roller 33a in the notch 37a of the cam 38a on the hub of the fly-wheel. The fly-wheel 15a is thus again locked to the shaft 12a and rotates at the same speed. In such case, therefore, the two centrifuges 18a and 19a again exert equal and opposite forces on the spider member 31a.

It will be apparent that if a braking effect were not exerted on the fly-wheel 15a, it would continue to rotate at a speed faster than that corresponding to car speed except as it would decelerate gradually due to friction in the bearings journaling it to the shaft 12a. In such case, the restoration of the spider 31a to its normal left-hand position would be delayed until such time as the differential in the centrifugal forces of the two centrifuges 18a and 19a diminished sufficiently so as to permit restoration of the spider member 31a by the springs 39a and 137. It is desirable, therefore, to exert a braking effect on the fly-wheel 15a so that, at the time the slipping wheels are restored to car speed, the fly-wheel 15a is rotating instantaneously at a speed corresponding to car speed, thereby insuring the prompt opening of the switch 57 and consequent termination of the reduction of pressure in the brake cylinder 104.

In view of the complete description of the operation of the control device 11 in connection with the fluid pressure brake system shown in Figure 1, it is believed unnecessary to further describe the operation of the control device 11a of Figure 4.

Having now described my invention, what I claim as new and desire to secure by Letters Patent is:

1. A control device comprising a shaft rotatable at different speeds, a fly-wheel, a clutch device establishing a connection whereby rotation of the shaft causes rotation of the fly-wheel and permitting rotation of the fly-wheel and shaft at different relative speeds differing in degree according to the rate of change of rotational speed of the shaft, means responsive to the speed of the shaft, means responsive to the speed of the fly-wheel, and control means operatively controlled by said two speed responsive means.

2. A control device comprising a shaft rotatable at different speeds, a fly-wheel, a clutch device establishing a driving connection whereby said fly-wheel is rotated upon rotation of the shaft and permitting rotation of the fly-wheel at speeds differing in degree with respect to the speed of the shaft dependent upon the rate of change of speed of the shaft, centrifugal means rotatable at all times in accordance with the rotational speeds of the shaft, centrifugal means rotatable at all times in accordance with the rotational speed of the fly-wheel, and control means operatively responsive according to the relation of the forces exerted by said two centrifugal means.

3. A control device comprising a shaft rotatable at different speeds, a fly-wheel, a clutch device establishing a driving connection whereby said fly-wheel is rotated upon rotation of the shaft and permitting rotation of the fly-wheel at speeds differing in degree with respect to the speed of the shaft dependent upon the rate of change of speed of the shaft, centrifugal means rotatable at all times in accordance with the rotational speed of the shaft, centrifugal means rotatable at all times in accordance with the rotational speed of the fly-wheel, and control means operatively responsive to a predetermined differential in the forces exerted by said two centrifugal means.

4. A control device comprising a shaft rotatable at different speeds, a fly-wheel, a clutch device including a movable member effective in one position to connect said fly-wheel to said shaft for rotation with said shaft and having a different position in which said fly-wheel is disconnected from said shaft, said clutch member being moved to a position disconnecting the fly-wheel from the shaft in response to the change in the rotational speed of the shaft at a rate exceeding a certain rate, means effective when the fly-wheel is disconnected from the shaft as long as the differential between the speeds of the shaft and fly-wheel exceeds a certain amount for maintaining said clutch member in a position disconnecting the fly-wheel from the shaft, and control means operatively responsive to movement of said clutch member.

5. A control device comprising a shaft rotatable at different speeds, a fly-wheel, a clutch device including a movable clutch member effective in one position to connect said fly-wheel to said shaft for rotation with said shaft and having a different position in which said fly-wheel is disconnected from said shaft, said clutch member being moved to a position disconnecting the fly-wheel from the shaft in response to the change in the rotational speed of the shaft at a rate exceeding a certain rate, centrifugal means rotatable at all times in accordance with the rotational speed of the shaft, centrifugal means rotatable at all times in accordance with the rotational speed of the fly-wheel, means effective as long as the differential in the forces exerted by the two centrifugal means exceeds a certain amount for maintaining said clutch member in a position disconnecting the fly-wheel from the shaft, and control means operatively responsive to movement of said clutch member.

6. A control device comprising a shaft rotatable at different speeds, a fly-wheel, a clutch device including a movable clutch member effective in one position to connect said fly-wheel to said shaft for rotation with said shaft and having a different position in which said fly-wheel is disconnected from said shaft, said clutch member being moved to a position disconnecting the fly-wheel from the shaft in response to the change in the rotational speed of the shaft at a rate exceeding a certain rate, electro-responsive means effective, when energized, to maintain said clutch member in its position disconnecting the fly-wheel from the shaft, means effective as long as the differential in the speeds of the fly-wheel and the shaft exceeds a certain amount for maintaining said electro-responsive means energized, and control means operatively responsive to movement of said clutch member.

7. A control device comprising a shaft rotatable at different speeds, a fly-wheel, a clutch device including a movable clutch member effective in one position to connect said fly-wheel to said shaft for rotation with said shaft and having a different position in which said fly-wheel is disconected from said shaft, said clutch member being moved to a position disconnecting the fly-wheel from the shaft in response to the change in the rotational speed of the shaft at a rate exceeding a certain rate, electro-magnetic means effective, while energized, to maintain the clutch member in its position disconnecting the fly-wheel from the shaft, centrifugal means rotatable at all times in accordance with the speed of the shaft, centrifugal means rotatable at all times in accordance with the speed of the fly-wheel, and means subject in opposing relation to the forces exerted by said two centrifugal means and effective to cause energization of said elctro-magnetic means as long as the differential in the speeds of the fly-wheel and shaft exceeds a certain amount, and control means operatively responsive to movement of the clutch member.

8. A control device comprising a shaft rotatable at different speeds, a fly-wheel rotatively mounted on said shaft, a clutch member fixed on said shaft for rotation therewith at all times and axially shiftable into and out of engagement with said fly-wheel to connect or disconnect said fly-wheel from said shaft, resilient means maintaining said clutch member in a position connecting the fly-wheel to the shaft as long as the shaft does not change its speed at a rate exceeding a certain rate and effective to yieldingly permit movement of the clutch member to a position disconnecting the fly-wheel from the shaft when the shaft rotatively changes its speed of rotation at a rate exceeding said certain rate, means operatively responsive to a predetermined differential in the rotational speeds of the fly-wheel and the shaft for maintaining said clutch member in a position disconnecting the fly-wheel from the shaft once the clutch member is moved to the disconnecting position, and control means operatively responsive to movement of said clutch member.

9. A control device comprising a shaft rotatable at different speeds, a fly-wheel rotatively mounted on said shaft, a clutch member fixed on said shaft for rotation therewith at all times and axially shiftable into and out of engagement with said fly-wheel to connect or disconnect said fly-wheel from said shaft, resilient means maintaining said clutch member in a position connecting the fly-wheel to the shaft as long as the shaft does not change its speed at a rate exceeding a certain rate and effective to yieldingly permit movement of the clutch member to a position disconnecting the fly-wheel from the shaft when the shaft rotatively changes its speed of rotation at a rate exceeding said certain rate, non-rotative electro-magnetic means associated with said clutch member and effective, while energized, after the clutch member is moved to its position disconnecting the fly-wheel from the shaft to maintain said clutch member in its disconnecting position, means operatively responsive to a predetermined differential in the rotational speeds of the fly-wheel and shaft for maintaining said electro-magnetic means energized, and control means operatively responsive to movement of said clutch member.

10. A control device comprising a shaft rotatable at different speeds, a fly-wheel rotatively mounted on said shaft, a clutch member on said shaft for rotation therewith at all times and axially shiftable into and out of engagement with said fly-wheel to connect or disconnect said fly-wheel from said shaft, resilient means maintaining said clutch member in a position connecting the fly-wheel to the shaft as long as the shaft does not change its speed at a rate exceeding a certain rate and effective to yieldingly permit movement of the clutch member to a position disconnecting the fly-wheel from the shaft when the shaft rotatively changes its speed of rotation at a rate exceeding said certain rate, electro-magnetic means associated with said clutch member and effective, while energized, after the clutch member is shifted axially to its position disconnecting the fly-wheel from the shaft for maintaining the clutch member in its disconnecting position, centrifuge means carried by shaft, centrifuge means carried by said fly-wheel, means operatively responsive to a predetermined differential in the forces exerted by the two centrifuge means for effecting energization of said electro-magnetic means, and control means operatively responsive to axial movement of said clutch member.

11. A control device comprising a shaft rotatable at different speeds, a fly-wheel, clutch member for connecting and disconnecting said fly-wheel from said shaft, resilient means effective to urge said clutch member in a direction to connect the fly-wheel to the shaft, means for exerting opposing forces on said clutch member corresponding respectively to the rotational speeds of the shaft and fly-wheel, and control means operatively responsive to the movement of said clutch member.

12. A control device comprising a shaft rotatable at different speeds, a fly-wheel, clutch member for connecting and disconnecting said fly-wheel from said shaft, resilient means effective to urge said clutch member in a direction to connect the fly-wheel to the shaft, a centrifuge device rotatable at all times in accordance with the rotational speed of the shaft for exerting a corresponding force on the clutch member urging it in a direction to connect the fly-wheel to shaft, a centrifuge device rotatable at all times in accordance with the rotational speed of the fly-wheel and exerting a force on said clutch member in opposition to the force of the first said centrifuge device whereby to maintain the clutch member in a position disconnecting the fly-wheel from the shaft as long as the differential in the forces exerted by the two centrifuge devices exceeds a certain amount, and control means operatively responsive to movement of the clutch member.

13. A control device comprising a shaft rotatable at different speeds, a fly-wheel, a clutch member effective in one position to connect said fly-wheel to said shaft and shiftable to a different position in which said fly-wheel is disconnected from said shaft, resilient means urging the clutch member toward the position in which it connects the fly-wheel to the shaft, a centrifuge device carried by said shaft and effective to exert a force on said clutch member urging it toward the position in which it connects the fly-wheel to the shaft, a centrifuge device carried by said fly-wheel and effective to exert a force on said clutch member in opposition to the force of the first said centrifuge device, said fly-wheel being so constructed and arranged that the inertia of the fly-wheel is effective upon a change in the rotational speed of the shaft to exert a force on said clutch member in a direction to disconnect the fly-wheel from the shaft, the unbalanced forces exerted by the two centrifuge devices being effective to maintain said clutch member in a position disconnecting the fly-wheel from the shaft as long as the rotational speeds of the fly-wheel and shaft differ relatively by more than a certain amount, and control means operatively responsive to movement of said clutch member.

14. A control device comprising a shaft rotatable at different speeds, a fly-wheel, a clutch device for connecting said fly-wheel to and disconnecting said fly-wheel from said shaft, means responsive to the inertia of the fly-wheel upon a change in the rotational speed of the shaft for operating said clutch device to disconnect said fly-wheel from said shaft, means effective upon relative rotational movement of the fly-wheel and shaft to exert a braking effect on said fly-wheel, means effective in response to a predetermined differential in the rotational speeds of the fly-wheel and shaft to maintain the clutch device in a position disconnecting the fly-wheel from the shaft, and control means actuated from a normal position to an operated position in response to rotational movement of the fly-wheel relative to said shaft.

15. A control device comprising a shaft rotatable at different speeds, a fly-wheel, a clutch member rotatable with the shaft and shiftable axially on said shaft into and out of a position establishing a driving connection between the shaft and the fly-wheel, said fly-wheel cooperating with said clutch member in such a manner as to shift the clutch member to position disconnecting the fly-wheel from the shaft when the shaft changes its speed of rotation at a rate exceeding a certain rate, means carried by the clutch member and frictionally engaging the fly-wheel to exert a braking effect thereon upon relative rotational movement of the fly-wheel and shaft, means responsive to a predetermined differential in the rotational speeds of the fly-wheel and shaft for maintaining said clutch member in a position disconnecting the fly-wheel from the shaft, and control means operatively responsive to the axial movement of said clutch member.

16. A control device comprising a shaft rotatable at different speeds, a fly-wheel, a clutch device establishing a driving connection from the shaft to the fly-wheel and effective to permit rotational movement of the fly-wheel with respect to the shaft, means for exerting a braking effect on the fly-wheel when the fly-wheel rotates with respect to said shaft, and control means operatively responsive to a predetermined differential in the rotational speeds of the fly-wheel and shaft.

17. In a vehicle brake control system of the type having brake control means operative during a brake application to effect a reduction in the degree of application of the brakes associated with a wheel of the vehicle, the combination of a fly-wheel, clutch means providing a driving connection between the fly-wheel and the vehicle wheel and effective to permit rotation of the fly-wheel at a speed higher than that of said wheel when the wheel rotatively decelerates at a rate exceeding a certain rate, a control device actuated from a normal to an operated condition in response to the rotational movement of the fly-wheel with respect to the said wheel for initiating operation of said brake control means, and speed differential responsive means effective as long as the differential in the rotational speeds of the fly-wheel and vehicle wheel exceeds a certain amount for maintaining said brake control means in an operative condition.

18. In a vehicle brake control system of the type having brake control means operative during a brake application to effect a reduction in the degree of application of the brakes associated with a wheel of the vehicle, the combination of a fly-wheel, clutch means providing a driving connection between the fly-wheel and the vehicle wheel and effective to permit rotation of the fly-wheel at a speed higher than that of said wheel when the wheel rotatively decelerates at a rate exceeding a certain rate, a control device actuated from a normal to an operated condition in response to the rotational movement of the fly-wheel with respect to the said wheel for initiating operation of said brake control means, and speed differential responsive means effective as long as the differential in the rotational speeds of the fly-wheel and the said wheel exceeds a certain amount for causing said control device to be maintained in its operated condition.

19. In a vehicle brake control system of the type having means operative during a brake application to effect a reduction in the degree of application of the brakes associated with a wheel of the vehicle, the combination of a fly-wheel, clutch means providing a driving connection between the fly-wheel and the vehicle wheel and effective to permit rotation of the fly-wheel at a speed higher than that of said wheel when the wheel rotatively decelerates at a rate exceeding a certain rate, a control device actuated from a normal to an operated condition in response to the rotational movement of the fly-wheel with respect to the said wheel for initiating operation of said brake control means, a first centrifuge device rotatable at all times in accordance with the rotational speed of the vehicle wheel, a second centrifugal device rotatable at all times in accordance with the rotational speed of the fly-wheel, and means responsive to a predetermined differential between the forces exerted by said centrifuge devices for causing said control device to remain in its operated condition.

20. In a vehicle brake control equipment of the type having a magnet valve device effective when energized during a brake application to effect a reduction in the degree of application of the brakes associated with a wheel of the vehicle, the combination of a fly-wheel, a clutch member rotatable at all times according to the rotational speed of the vehicle wheel, resilient means biasing said clutch member into engagement with said fly-wheel to establish a driving connection between the vehicle wheel and the fly-wheel and yieldingly responsive to the inertia of the fly-wheel to permit movement of the clutch member to disconnect the fly-wheel from the vehicle wheel, switch means operatively responsive to the movement of the clutch member when disconnecting the fly-wheel from the vehicle wheel to cause energization of said magnet valve means, electro-magnetic means effective when energized to maintain said clutch member in a position disconnecting said fly-wheel from said vehicle wheel, and means responsive to a predetermined differential in the rotational speeds of the fly-wheel and the vehicle wheel for maintaining said electro-magnetic means energized.

21. In a vehicle brake control equipment of the type having a magnet valve device effective when energized during a brake application to effect a reduction in the degree of application of the brakes associated with a wheel of the vehicle, the combination of a fly-wheel, a clutch member rotatable at all times according to the rotational speed of the vehicle wheel, resilient means biasing said clutch member into engagement with said fly-wheel to establish a driving connection between the vehicle wheel and the fly-wheel and yieldingly responsive to the inertia of the fly-wheel to permit movement of the clutch member to disconnect the fly-wheel from the vehicle wheel, switch means operatively responsive to the movement of the clutch member when disconnecting the fly-wheel from the vehicle wheel to cause energization of said magnet valve means, electro-magnetic means effective when energized to maintain said clutch member in a position disconnecting said fly-wheel from said vehicle wheel, a first centrifuge device rotatable at all times according to the rotational speed of the vehicle wheel, a second centrifuge device rotatable at all times in accordance with the rotational speed of the fly-wheel, and switch means operatively responsive to a predetermined differential in the forces exerted by said two centrifuge devices for causing energization of electro-magnetic means.

22. A control device comprising a shaft rotatable at different speeds, a fly-wheel, a clutch device normally associating the fly-wheel with the shaft in such a manner as to cause the fly-wheel and shaft to rotate together at the same speed, means responsive to a change in the rotational speed of the shaft at a rate exceeding a certain rate for effecting operation of the clutch device in a manner to free the fly-wheel for rotation at a speed different from the speed of rotation of the shaft, and control means operatively responsive to a certain differential in the rotational speeds of the fly-wheel and the shaft for controlling the clutch device in a manner to maintain the fly-wheel freely rotatable with respect to and at a different speed than said shaft.

23. A control device comprising a shaft rotatable at different speeds, a fly-wheel, a clutch device normally associating said fly-wheel with the shaft in a manner to cause rotation of the fly-wheel and shaft together at the same speed, means responsive to a change in the rotational speed of the shaft at a rate exceeding a certain rate for effecting operation of the clutch device to free the fly-wheel for rotation at a different speed than said shaft, means responsive to the speed of the shaft, means responsive to the speed of the fly-wheel, and control means operatively controlled by the cooperative action of said two speed responsive means for controlling the said clutch device in a manner to maintain the fly-wheel freely rotatable with respect to and at a different speed than the shaft as long as there is a certain differential between the speed of the fly-wheel and that of the shaft.

CLYDE C. FARMER.